(12) United States Patent
Nakamura

(10) Patent No.: US 9,802,691 B2
(45) Date of Patent: Oct. 31, 2017

(54) BUOYANT AERIAL VEHICLE

(71) Applicant: Kohei Nakamura, Sapporo (JP)

(72) Inventor: Kohei Nakamura, Sapporo (JP)

( * ) Notice: Subject to any disclaimer, the term of this patent is extended or adjusted under 35 U.S.C. 154(b) by 0 days.

(21) Appl. No.: 15/322,008

(22) PCT Filed: Jun. 15, 2016

(86) PCT No.: PCT/JP2016/067809
§ 371 (c)(1),
(2) Date: Dec. 23, 2016

(87) PCT Pub. No.: WO2016/204180
PCT Pub. Date: Dec. 22, 2016

(65) Prior Publication Data
US 2017/0137104 A1 May 18, 2017

(30) Foreign Application Priority Data
Jun. 17, 2015 (JP) ................. 2015-122335

(51) Int. Cl.
*B64B 1/30* (2006.01)
*B64B 1/58* (2006.01)
(Continued)

(52) U.S. Cl.
CPC .................. *B64B 1/30* (2013.01); *B64B 1/58* (2013.01); *B64C 25/06* (2013.01); *B64C 39/024* (2013.01);
(Continued)

(58) Field of Classification Search
CPC ...... B64B 1/00; B64B 1/06; B64B 1/24–1/34; B64B 1/58; B64B 2201/00; B64C 2201/022; B64C 2201/101
See application file for complete search history.

(56) References Cited

U.S. PATENT DOCUMENTS 3,227,400 A * 1/1966 Stahmer .............. B64C 29/0066
  244/29
3,856,238 A * 12/1974 Malvestuto, Jr. ......... B64B 1/00
  244/25
(Continued)

FOREIGN PATENT DOCUMENTS

DE  10 2008 038872 A1  2/2010
FR       2831518 A1  5/2003
(Continued)

OTHER PUBLICATIONS

International Search Report of PCT/JP2016/067809.
Supplementary European Search Report of the corresponding application No. EP16 81 1654 dated Aug. 23, 2017.

*Primary Examiner* — Joseph W Sanderson
(74) *Attorney, Agent, or Firm* — Muncy, Geissler, Olds & Lowe, P.C.

(57) ABSTRACT

A buoyant aerial vehicle includes a buoyant vehicle body in which gas having a specific gravity smaller than air is hermetically filled, a vertical propulsion propeller which provides vertical propulsive force, and a horizontal propulsion propeller which provides horizontal propulsive force The buoyant vehicle body is configured with flotation chambers and connecting portions. The flotation chambers are arranged at positions point-symmetric with respect to a center of the buoyant vehicle body. Central portions of the flotation chambers are bulged in a side view and the connecting portions connect the flotation chambers. The connecting portions are formed in a flat shape thinner than the central portions of the flotation chambers such that wind passages along which the air flows are formed on the connecting portions, and the wind passages are oriented in at least two directions in the plan view.

13 Claims, 14 Drawing Sheets

(51) Int. Cl.
  *B64C 39/02* (2006.01)
  *B64C 25/06* (2006.01)
(52) U.S. Cl.
  CPC .. *B64C 2201/022* (2013.01); *B64C 2201/027* (2013.01); *B64C 2201/101* (2013.01); *B64C 2201/108* (2013.01); *B64C 2201/127* (2013.01)

(56) References Cited

U.S. PATENT DOCUMENTS

| | | | |
|---|---|---|---|
| 4,685,640 A | | 8/1987 | Warrington et al. |
| 5,026,003 A | * | 6/1991 | Smith ................... B64B 1/60 244/127 |
| 5,071,090 A | * | 12/1991 | Takahashi ................ B64B 1/02 244/125 |
| 5,383,627 A | | 1/1995 | Bundo |
| 5,823,468 A | | 10/1998 | Bothe |
| 6,286,783 B1 | | 9/2001 | Kunkler |
| 6,581,873 B2 | * | 6/2003 | McDermott ............. B64B 1/08 244/24 |
| 6,860,449 B1 | | 3/2005 | Chen |
| 8,596,571 B2 | * | 12/2013 | Goelet ..................... B64B 1/06 244/13 |
| 2002/0003189 A1 | * | 1/2002 | Kuenkler ............... B63H 5/125 244/26 |
| 2002/0014555 A1 | | 2/2002 | Smith |
| 2003/0052223 A1 | | 3/2003 | Izutsu et al. |
| 2008/0048065 A1 | | 2/2008 | Cuntz |
| 2012/0248241 A1 | * | 10/2012 | Goelet ..................... B64B 1/06 244/30 |
| 2012/0273608 A1 | * | 11/2012 | Jess ......................... B64B 1/08 244/26 |
| 2014/0034776 A1 | | 2/2014 | Huston |
| 2016/0023748 A1 | * | 1/2016 | Kempshall ............... B64C 3/44 244/5 |

FOREIGN PATENT DOCUMENTS

| | | |
|---|---|---|
| GB | 1548884 A | 7/1979 |
| JP | 59-145695 A | 8/1984 |
| JP | 62-18397 A | 1/1987 |
| JP | 6-64592 A | 3/1994 |
| JP | 11-513635 A | 11/1999 |
| JP | 2001-507306 A | 6/2001 |
| JP | 2003-54495 A | 2/2003 |
| JP | 2010-208501 A | 9/2010 |
| JP | 2014-227016 A | 12/2014 |
| WO | 2007/109826 A1 | 10/2007 |
| WO | 2014/045276 A1 | 3/2014 |

* cited by examiner

[FIG. 1]
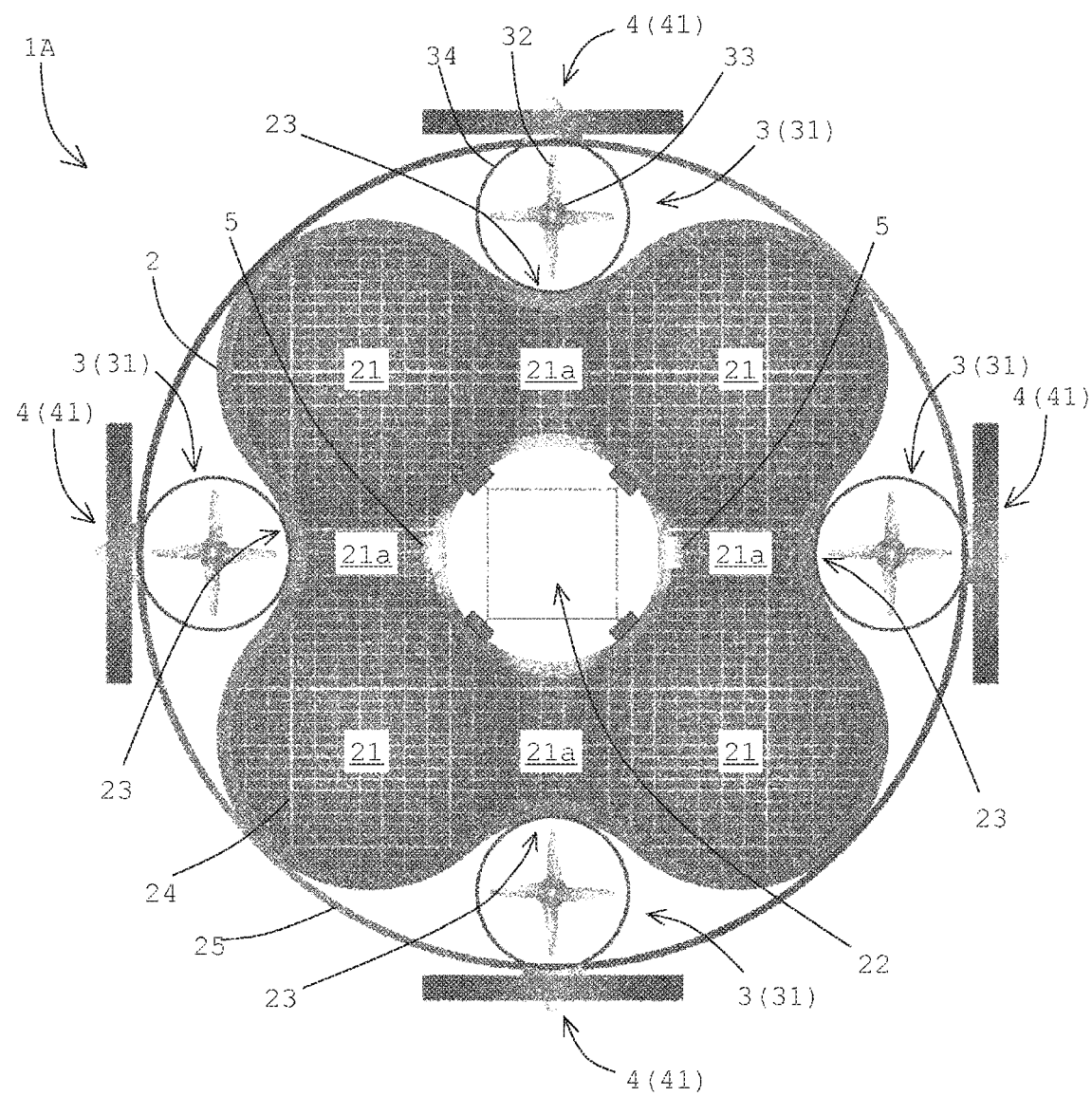

[FIG. 2]
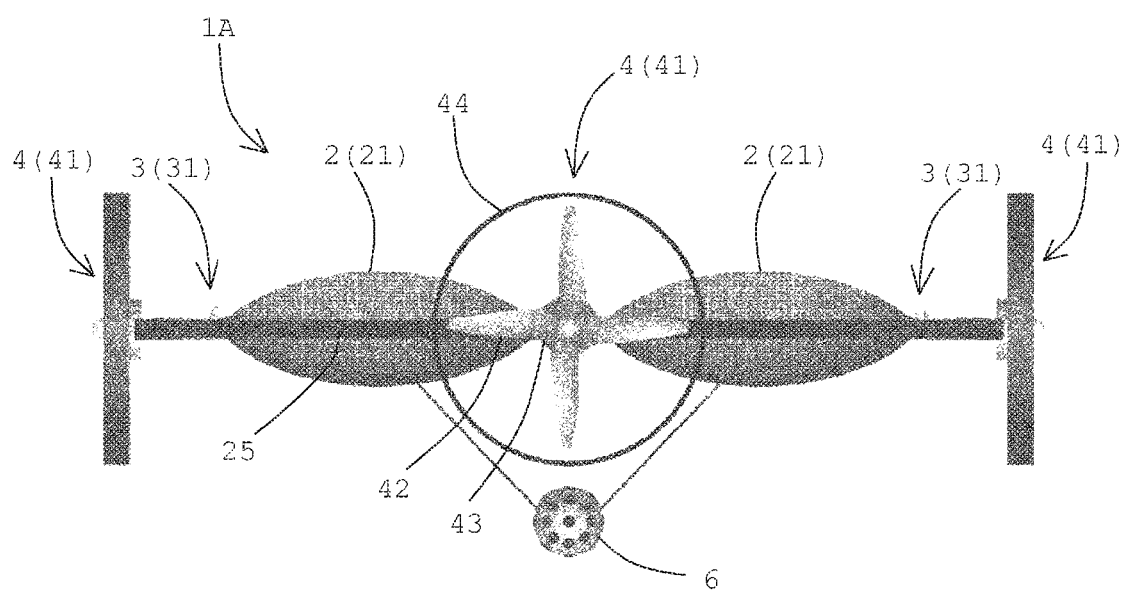

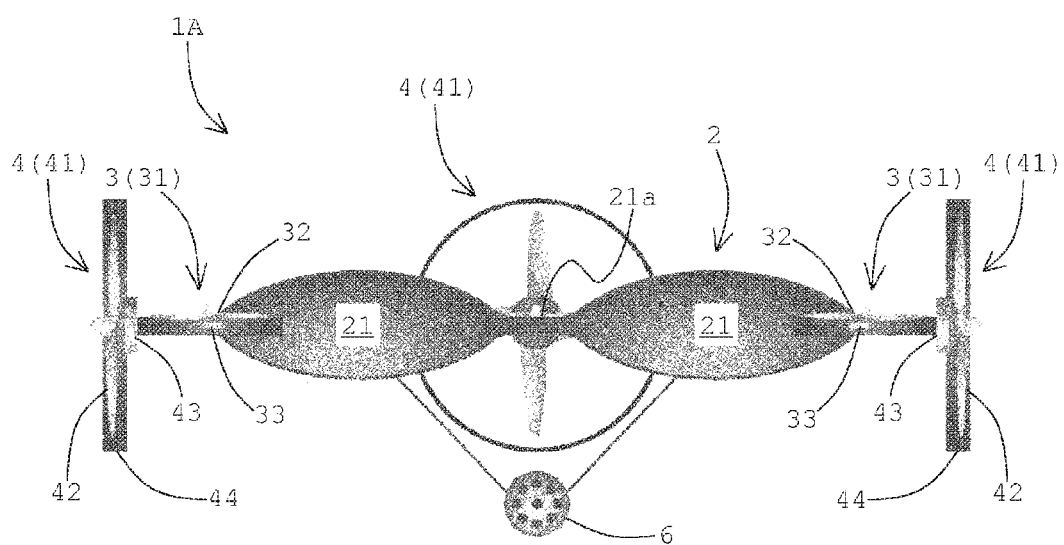
[FIG. 3]

[FIG. 4]
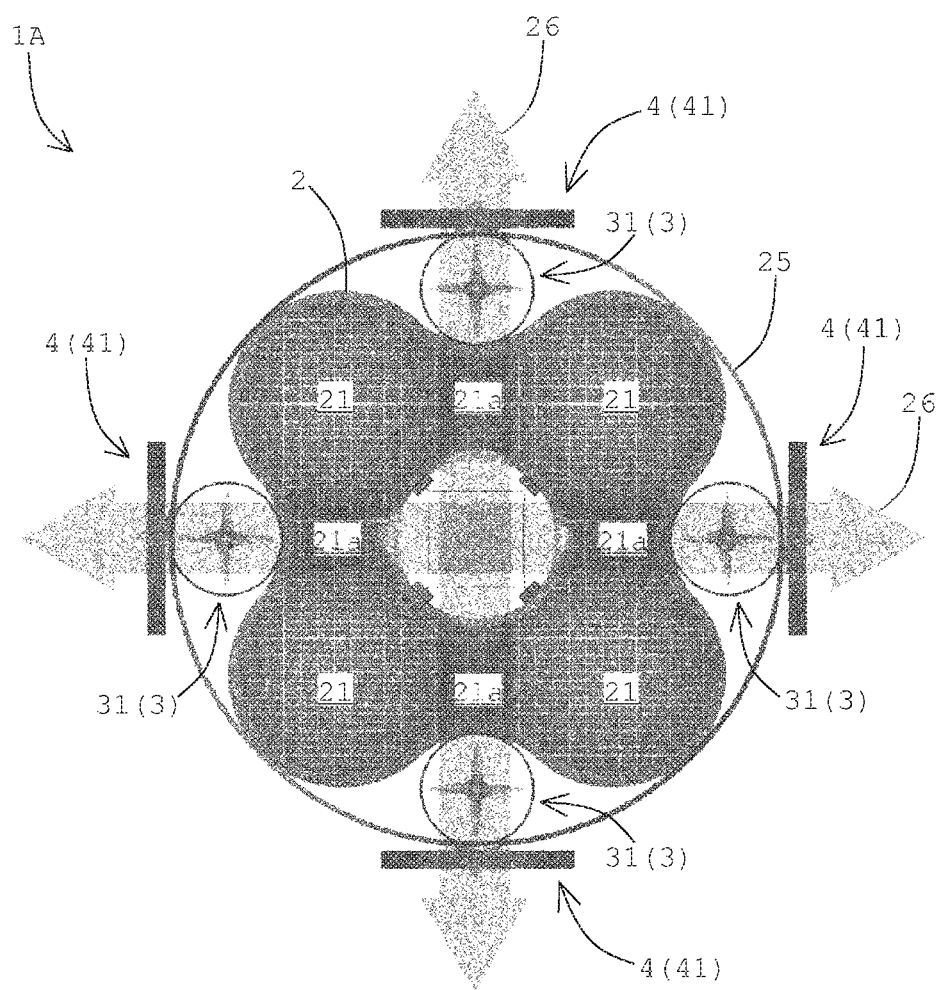

[FIG. 5]
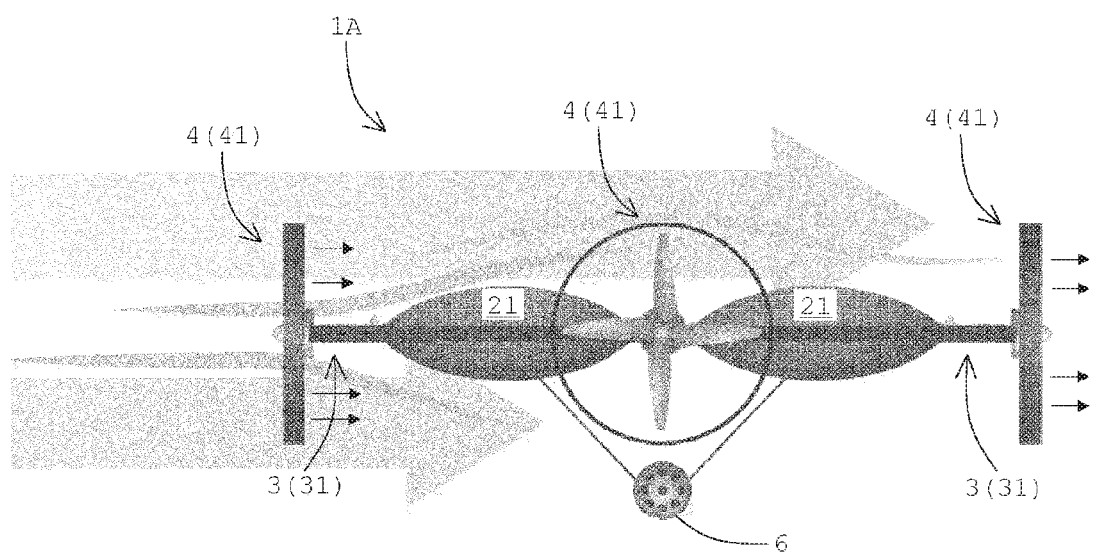

[FIG. 6]
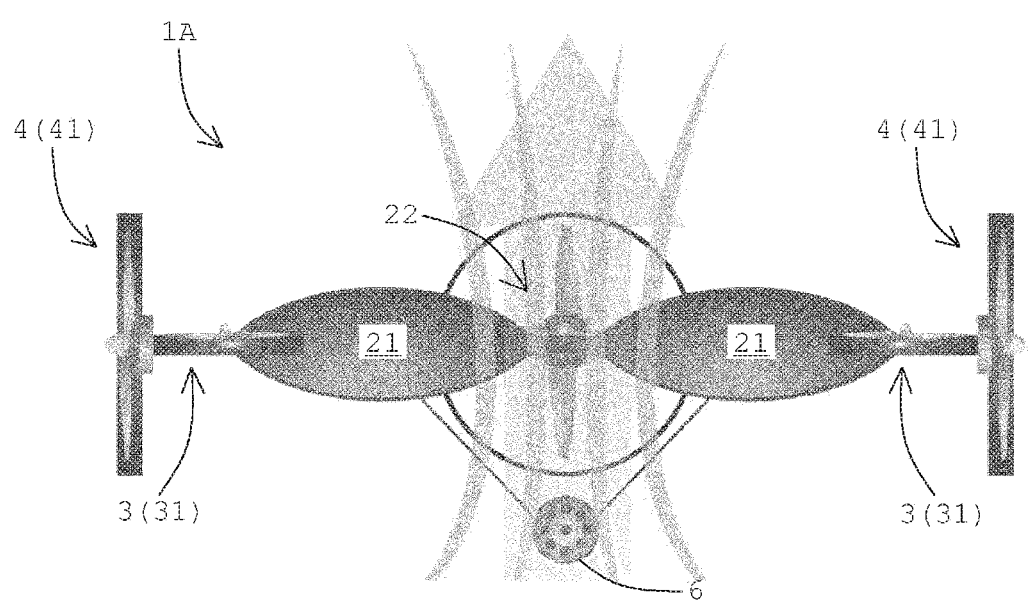

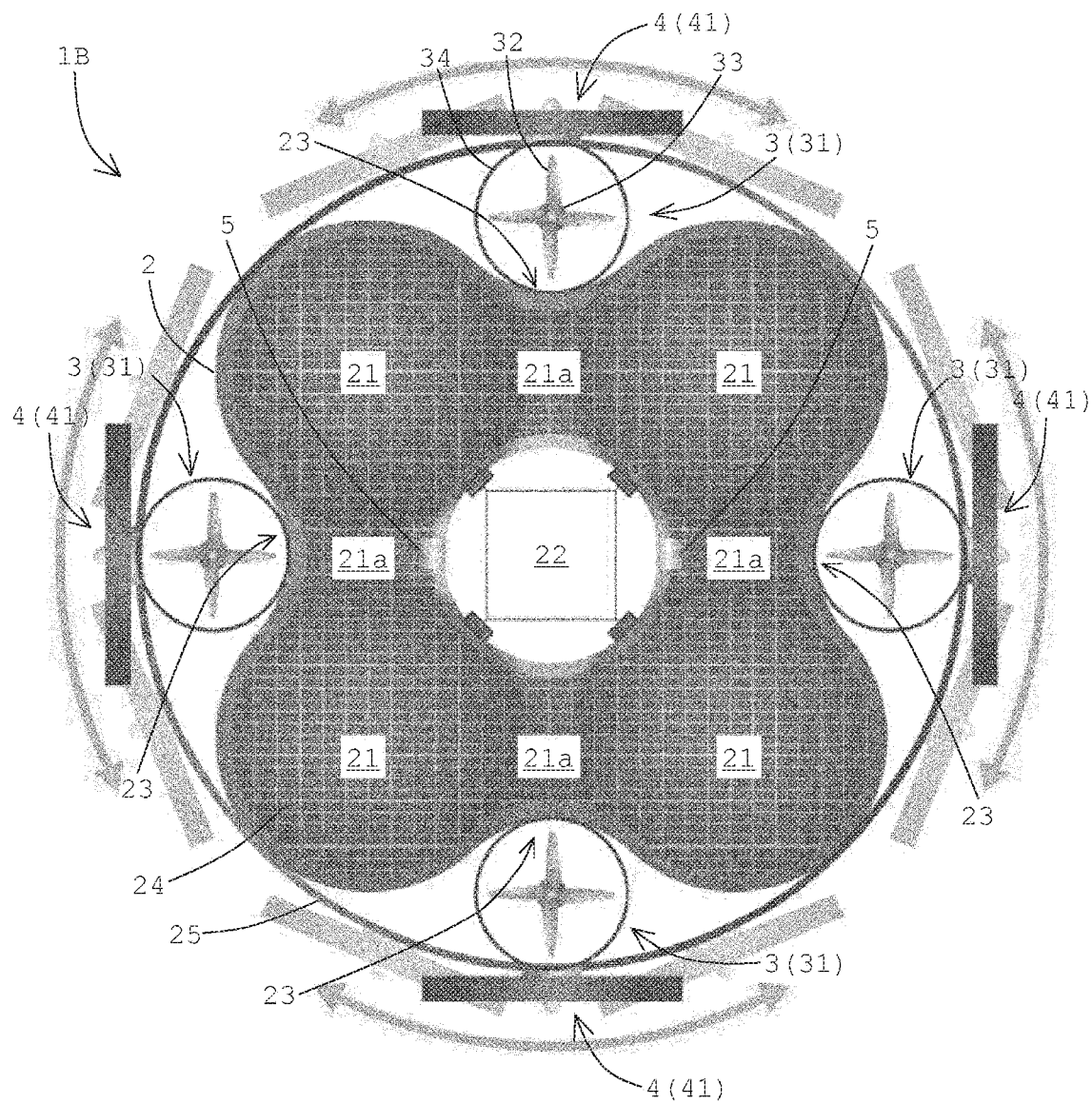
[FIG. 7]

[FIG. 8]
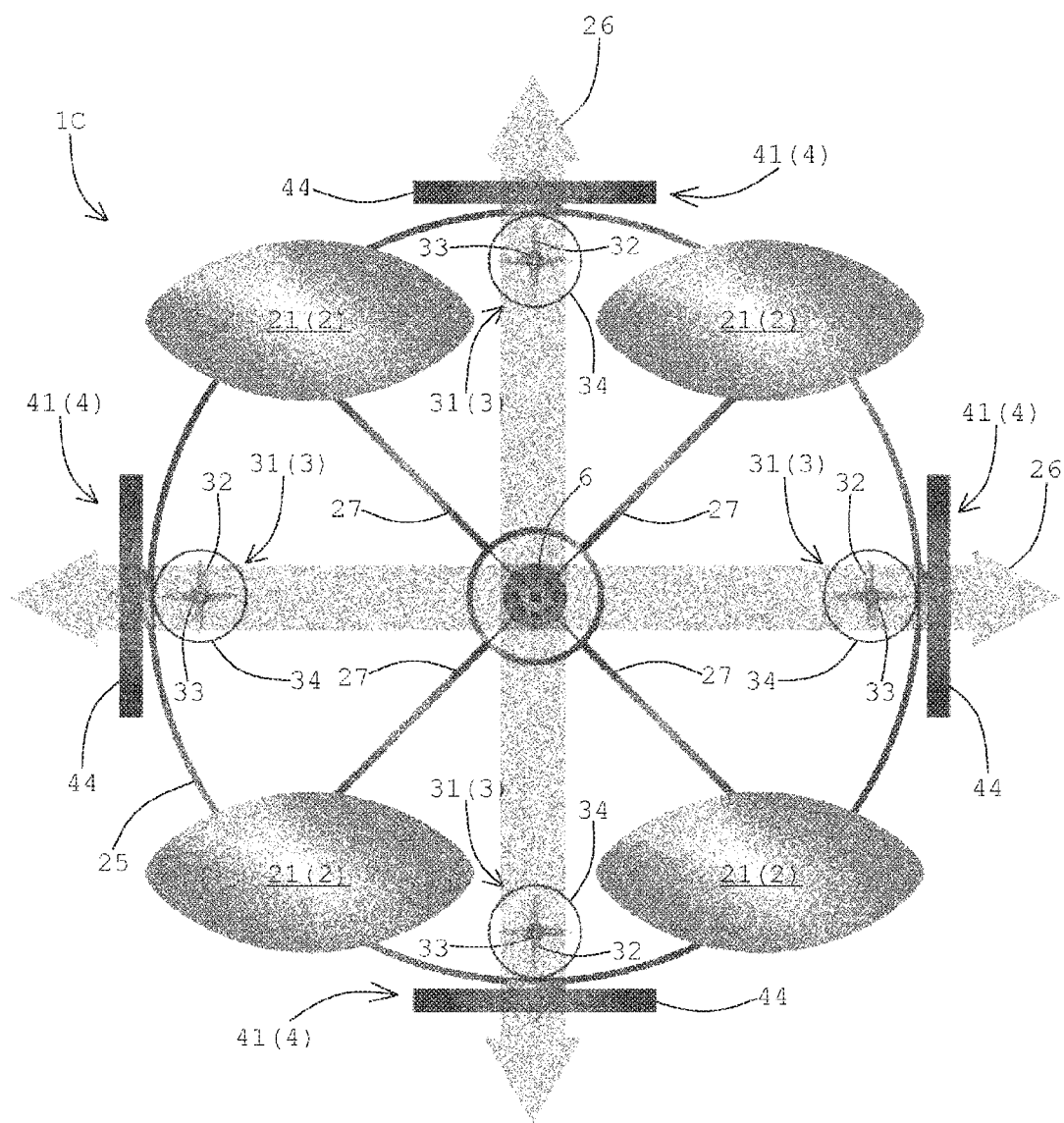

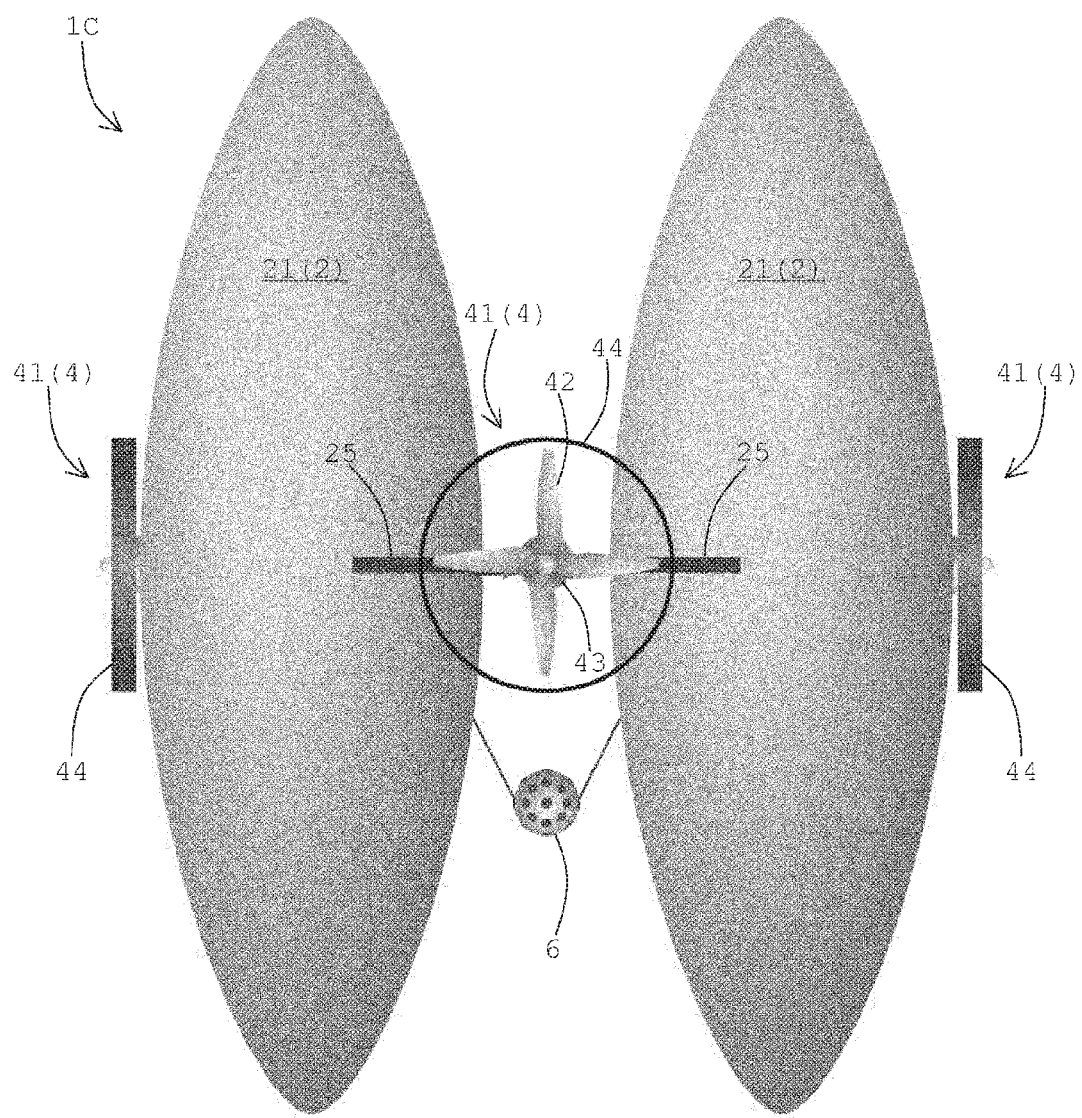
[FIG. 9]

[FIG. 10]
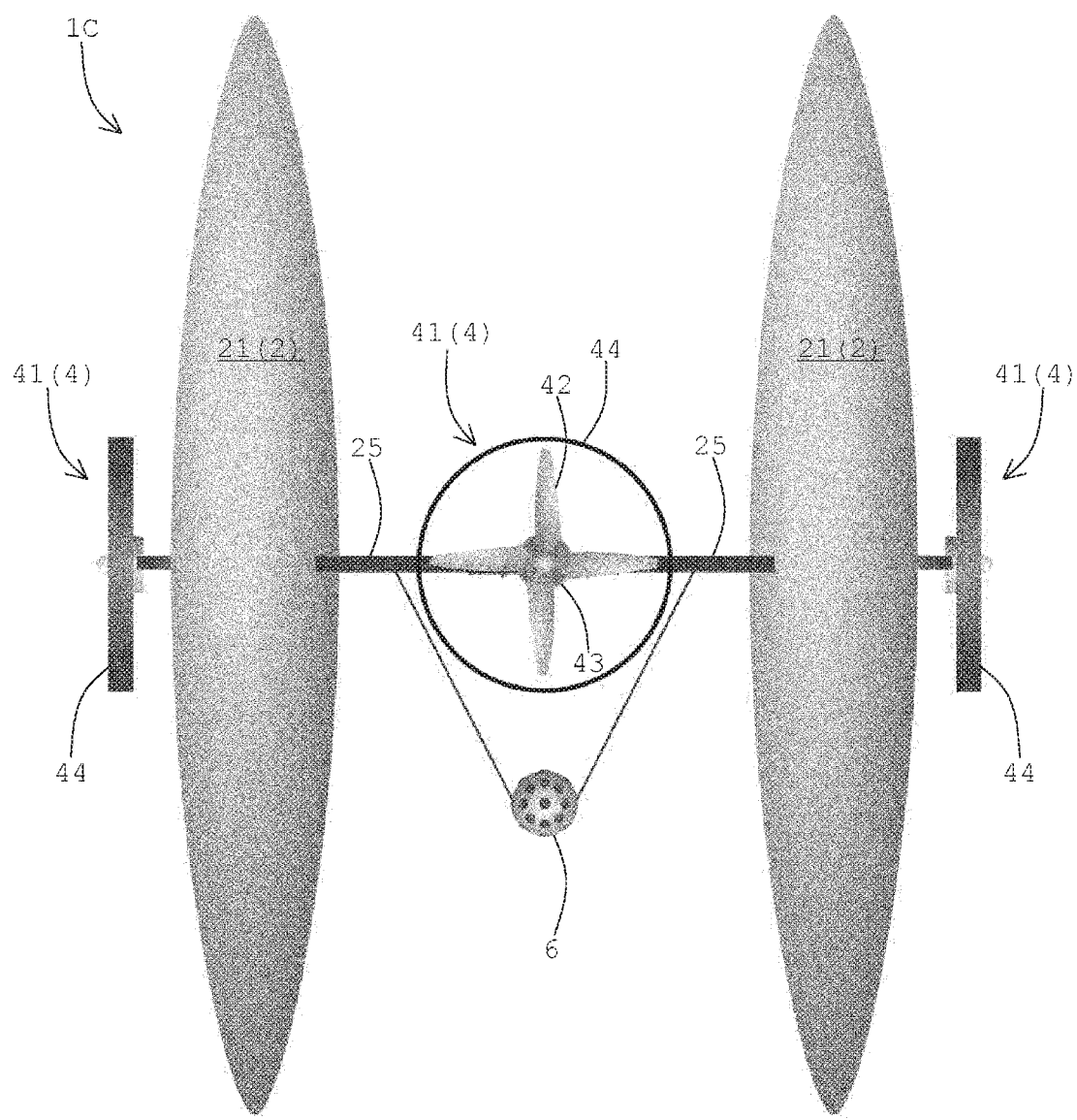

[FIG. 11]
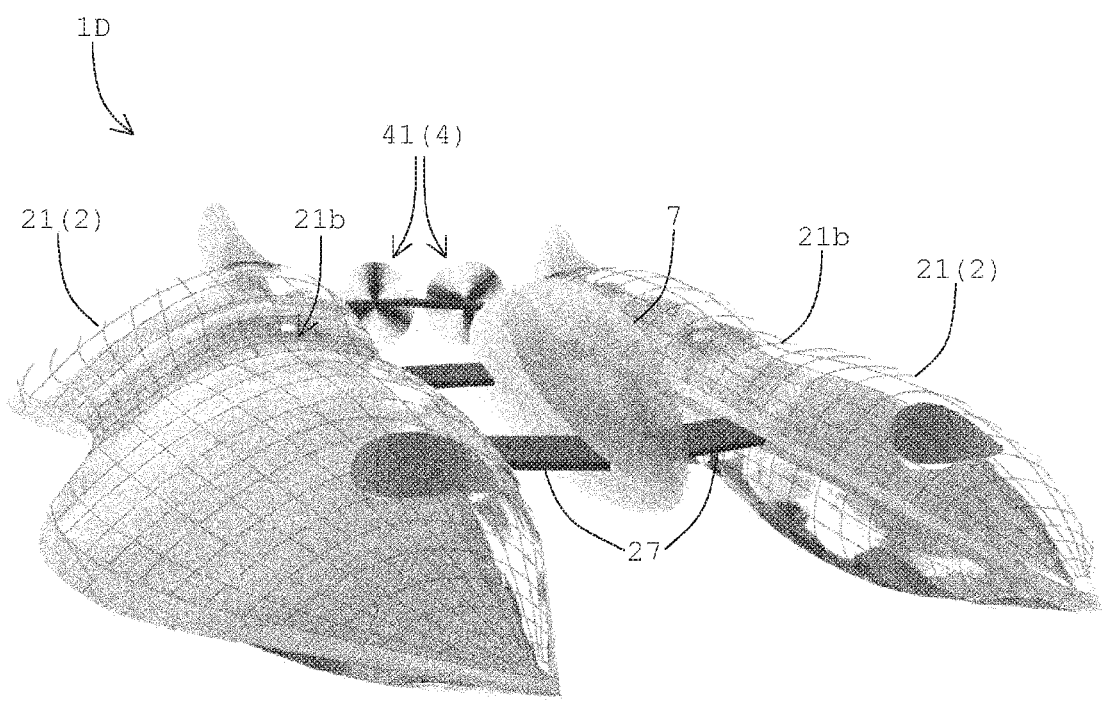

[FIG. 12]
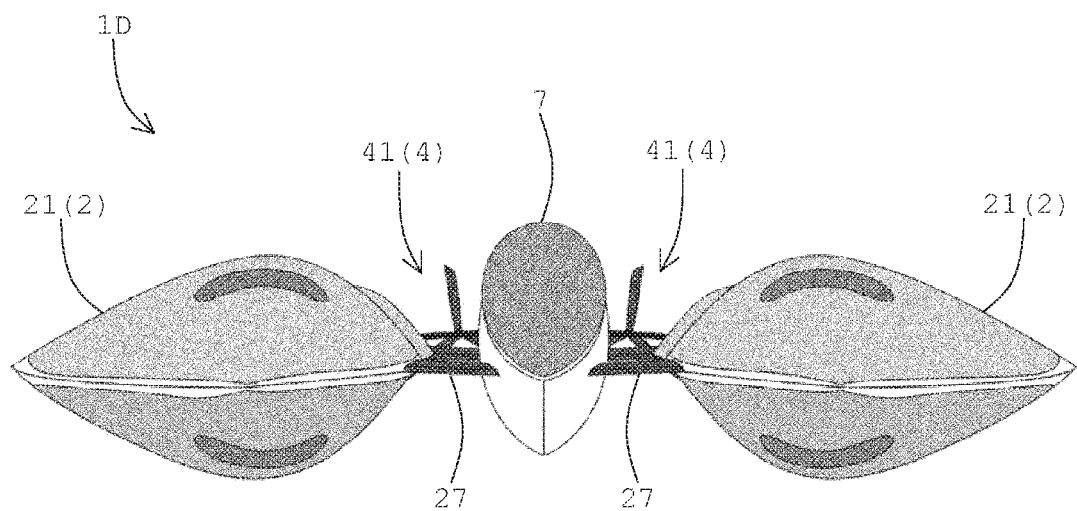

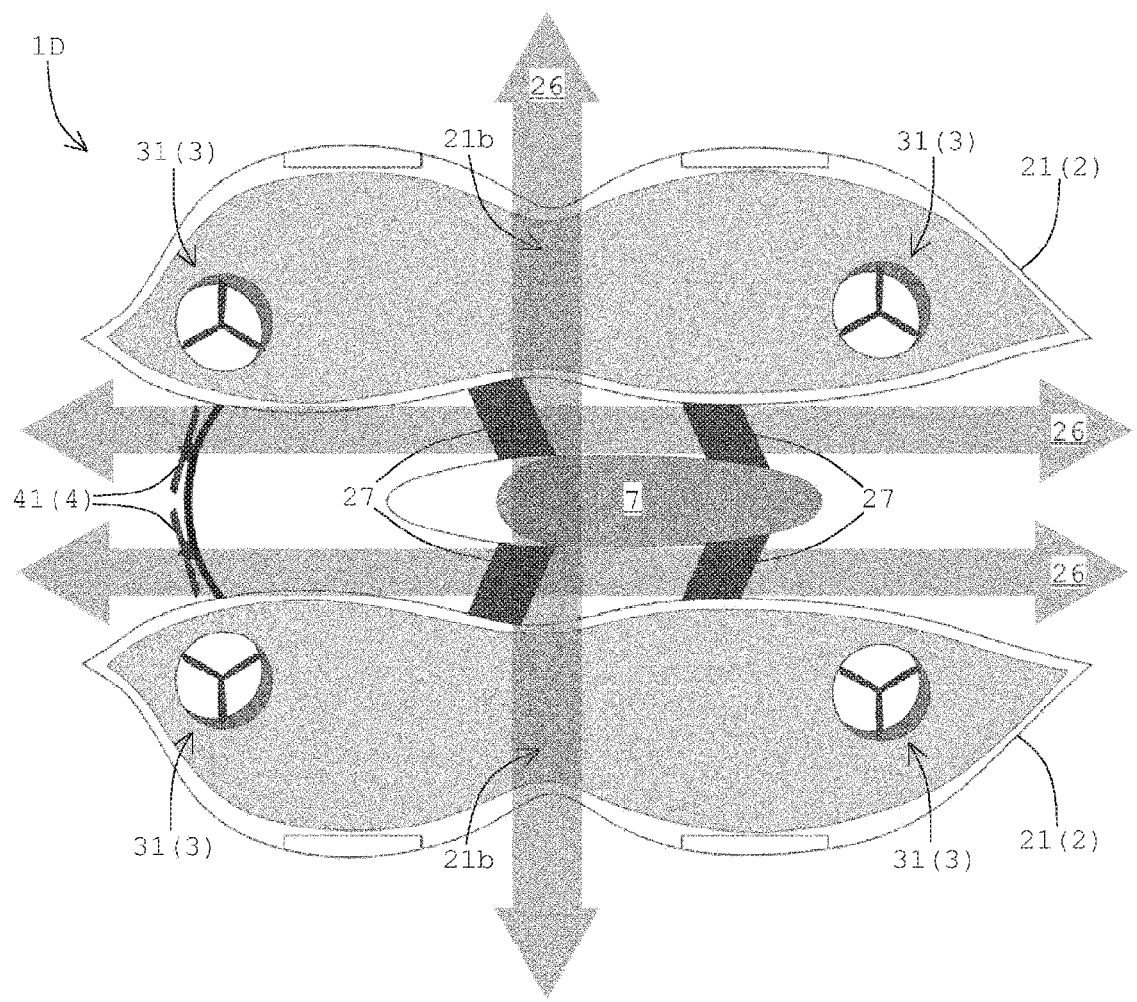
[FIG. 13]

[FIG. 14]
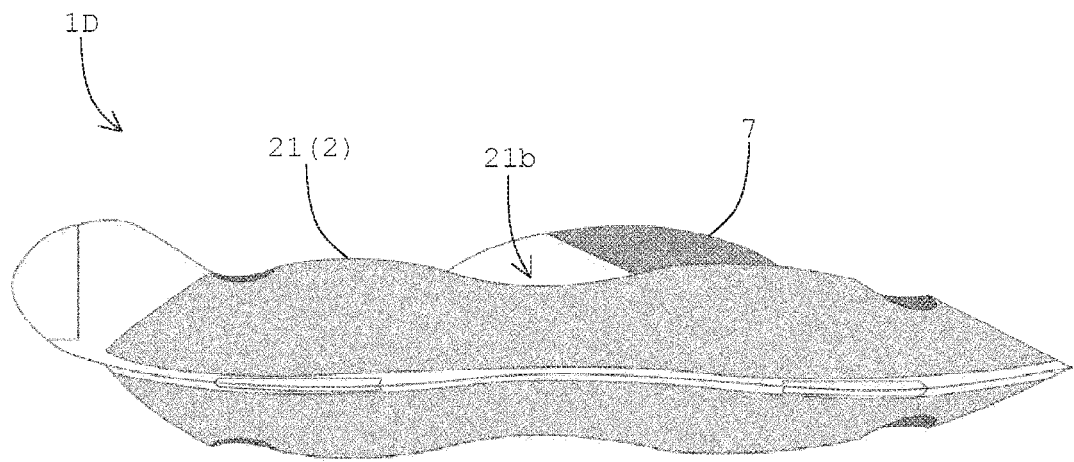

BUOYANT AERIAL VEHICLE

CROSS REFERENCE TO RELATED APPLICATIONS

This application is a national stage of International Application No.: PCT/JP2016/067809, which was filed on Jun. 15, 2016, and which claims priority to JP 2015-122335 which was filed on Jun. 17, 2015, and which are both herein incorporated by reference.

TECHNICAL FIELD

The present invention relates to a buoyant aerial vehicle used for carrying a load and a person, performing aerial photography, or the like.

BACKGROUND ART

Conventionally, balloons, airships, and the like, have been known as buoyant aerial vehicles. Each of the buoyant aerial vehicles floats by receiving buoyancy force due to the specific gravity difference between external air and gas filled in the balloon, and thereby, performs flight.

Further, in recent years, for the purpose of carrying a load and performing aerial photography, the development of an unmanned aerial vehicle (a so-called drone) has been conducted. For example, Japanese Patent Laid-Open No. 2014-227016 proposes an invention relating to a remote-control unmanned aerial vehicle provided with a propeller which generates lifting force by rotating, a drive source which rotates the propeller, and control means which controls the drive source (Patent Literature 1).

CITATION LIST

Patent Literature

Patent Literature 1: Japanese Patent Laid-Open No. 2014-227016

SUMMARY OF INVENTION

Technical Problem

However, in the conventional aerial vehicle described above, the balloon has a problem that it is difficult to control the direction of movement of the balloon to be greatly affected by the wind because the balloon is not provided with the power source for horizontal movement, and hence, the balloon is unsuitable for carrying a load and a person. Further, the airship has a problem that, since the airship has a balloon which is an elongated elliptical body, the airship easily receives wind resistance and hence cannot quickly move or change its moving direction.

Further, it is also reported that the conventional drone, including the unmanned aerial vehicle described in Patent Literature 1, crashes at the rate of once every 20 flights due to troubles, such as battery exhaustion (the current average flight time is only about 20 minutes), drive source failure, and damage of the propeller. Therefore, the conventional drone has high risk of accident caused by falling and of damage of the vehicle body. Further, the conventional drone performs the vertical movement and the horizontal movement by a common propeller oriented only in the vertical direction, and hence has the problem that the horizontal mobility capability is low. Further, the conventional drone needs to have a propeller larger than the vehicle body, and hence has the problem of noise and the problem of high danger when in contact with a person, or the like.

The present invention has been made in order to solve the above-described problems. An object of the present invention is to provide a buoyant aerial vehicle which can reduce the risk of crashing to thereby secure high safety, and which can suppress the influence of wind to thereby facilitate the control of movement and exhibit high mobility capability.

Solution to Problem

A buoyant aerial vehicle according to the present invention is configured by including: a buoyant vehicle body in which gas having a specific gravity smaller than air is hermetically filled; a vertical propulsion propeller which provides vertical propulsive force to the buoyant vehicle body; and a horizontal propulsion propeller which provides horizontal propulsive force to the buoyant vehicle body, and is configured such that the buoyant vehicle body has horizontal wind passages formed in at least two directions, and has outer peripheral edges each formed into an acute angle in side view.

Further, in one aspect of the present invention, the buoyant vehicle body may be configured by including: a vertical opening portion which is formed at an approximately central position of the buoyant vehicle body in plan view; and a plurality of flotation chambers which are respectively located at positions point-symmetric with respect to the center in plan view, and are connected in an integrated manner by connecting portions, and is configured such that central portions of the flotation chambers are bulged in the vertical direction in side view, each of the outer peripheral edges of the left and right end portions of the flotation chamber is formed in an acute angle, the connecting portion of the flotation chambers are formed in a flat shape thinner than the central portions of each connected flotation chambers; and horizontal wind passages are formed in at least two directions by each of the connecting portions.

Further, in one aspect of the present invention, each of the horizontal propulsion propellers may be arranged at an outer side of each of the connecting portions, and a rotating shaft of the horizontal propulsion propeller may be fixed towards the center direction of the buoyant vehicle body.

Further, in one aspect of the present invention, a propeller arrangement concave portion for arranging each of the vertical propulsion propellers may be formed at the connecting portion in the outer periphery of the buoyant vehicle body.

Further, a buoyant aerial vehicle according to the present invention is configured by including: a buoyant vehicle body in which gas having a specific gravity smaller than air is hermetically filled; vertical propulsion propellers, each of which provides vertical propulsive force to the buoyant vehicle body; and horizontal propulsion propellers, each of which provides horizontal propulsive force to the buoyant vehicle body, and is configured such that each of the horizontal propulsion propellers is pivotally supported at a substantially central position of the vertical direction thickness of the buoyant vehicle body, and such that a takeoff and landing ring, which is formed to have a diameter larger than the vertical direction thickness of the buoyant vehicle body, is arranged at the outer periphery of each of the horizontal propulsion propellers.

Further, in one aspect of the present invention, temperature adjusting means which adjusts the temperature of the gas; and a check valve which discharges the gas so that the pressure of the gas is maintained at not higher than a predetermined pressure may be included.

Further, in one aspect of the present invention, a ring frame which slidably supports each of the horizontal propulsion propellers; a drive motor which drives each of the horizontal propulsion propellers along the ring frame; one or both of a wind pressure sensor for detecting wind pressure, and a position sensor for detecting a present position; and a controller which adjusts left and right positions of each of the horizontal propulsion propellers by controlling the drive motor on the basis of detection results of one or both of the wind pressure sensor and the position sensor may be included.

Further, in one aspect of the present invention, the buoyant vehicle body may be formed by a plurality of independent flotation chambers, each of which is connected to the adjacent flotation chambers by the ring frame; the central portion of each of the flotation chambers may be bulged in the left and right direction in side view, the outer peripheral edge of each of the upper and lower end portions of the flotation chamber may be formed in an acute angle in side view, and each spaces between each of the flotation chambers may form horizontal wind passages in at least two directions.

Further, in one aspect of the present invention, the buoyant vehicle body may be formed by a plurality of independent flotation chambers connected to each other by connecting frames, a boarding chamber in which a person can board may be provided in spaces between each of the flotation chambers, a constricted portion may be formed at approximately the center of each of the flotation chambers, and spaces between each of the flotation chambers, and the constricted portions, may form horizontal wind passages in at least two directions.

Advantageous Effects of Invention

The present invention provides a buoyant aerial vehicle which can reduce the risk of crashing to thereby secure high safety, and which can suppress the influence of wind to thereby facilitate the control of movement and exhibit high mobility capability.

BRIEF DESCRIPTION OF DRAWINGS

FIG. 1 is a plan view showing a first embodiment of a buoyant aerial vehicle according to the present invention.

FIG. 2 is a side view showing the buoyant aerial vehicle of the first embodiment.

FIG. 3 is a longitudinal sectional view showing the buoyant aerial vehicle of the first embodiment.

FIG. 4 is a schematic view showing, by arrows, the flow of wind produced by horizontal propulsion propellers at the time of horizontal movement.

FIG. 5 is a schematic view showing, by arrows, the flow of wind colliding with the buoyant vehicle body at the time of horizontal movement.

FIG. 6 is a schematic view showing, by arrows, the flow of wind passing through a vertical opening portion at the time of vertical movement.

FIG. 7 is a plan view showing a second embodiment of the buoyant aerial vehicle according to the present invention.

FIG. 8 is a plan view showing a third embodiment of the buoyant aerial vehicle according to the present invention.

FIG. 9 is a front view showing the buoyant aerial vehicle of the third embodiment.

FIG. 10 is a side view showing the buoyant aerial vehicle of the third embodiment.

FIG. 11 is a perspective view showing a fourth embodiment of the buoyant aerial vehicle according to the present invention.

FIG. 12 is a front view showing the buoyant aerial vehicle of the fourth embodiment.

FIG. 13 is a plan view showing the buoyant aerial vehicle of the fourth embodiment.

FIG. 14 is a side view showing the buoyant aerial vehicle of the fourth embodiment.

DESCRIPTION OF EMBODIMENTS

In the following, an embodiment of a buoyant aerial vehicle according to the present invention will be described with reference to the accompanying drawings.

As shown in FIG. 1, a buoyant aerial vehicle 1A of a first embodiment includes: a buoyant vehicle body 2 in which gas having a specific gravity smaller than that of air is hermetically filled; a vertical propulsion propeller group 3 which provides vertical propulsive force to the buoyant vehicle body 2; a horizontal propulsion propeller group 4 which provides horizontal propulsive force to the buoyant vehicle body 2; and temperature adjusting means 5 which adjusts the temperature of gas in the buoyant vehicle body 2. In the following, each of the components will be described.

The buoyant vehicle body 2, in which gas having a specific gravity smaller than that of air is hermetically filled, receives buoyancy force due to the difference in the specific gravity between the surrounding air and the gas. Therefore, the buoyant vehicle body 2 can easily float in the air.

As shown in FIG. 1, in the first embodiment, the buoyant vehicle body 2 is provided with four flotation chambers 21 which are located at positions point-symmetric with respect to the center in plan view, and which are integrally connected by connecting portions 21a. A vertical opening portion 22, which allows air to flow in the vertical direction, is formed at approximately the central position of the buoyant vehicle body 2. Further, propeller arrangement concave portions 23, in which vertical propulsion propellers 31 are arranged, are formed in four locations at the connecting portions 21a of the flotation chambers 21 in the outer periphery of the buoyant vehicle body 2.

Further, as shown in FIG. 2 and FIG. 3, the buoyant vehicle body 2 is configured such that the central portion of each of the flotation chambers 21 is bulged in the vertical direction in side view, and such that the outer peripheral edge of each of the left and right end portions of each of the flotation chambers 21 is formed in an acute angle in side view. Further, the connecting portion 21a of each flotation chamber 21 is formed in a flat shape thinner than the central portion of each connected flotation chamber 21. Also, as shown in FIG. 4, respective connecting portions 21a form horizontal wind passages 26 in two mutually orthogonal directions.

It should be noted that, in the present invention, the horizontal wind passage 26 means a portion in which, when the buoyant aerial vehicle 1A receives horizontal direction wind, the wind power resistance of the portion is smaller than that of the flotation chamber 21, or the like, and which is formed on a substantially straight line to allow wind to easily pass therethrough. Further, in the first embodiment, as shown in FIG. 4, the horizontal wind passages 26 are provided in two directions perpendicular to each other, but the present invention is not limited to this configuration.

That is, as long as the wind power resistance due to side wind can be reduced, it is sufficient that the wind passages 26 be formed in at least two directions.

Further, in the first embodiment, the shape of the buoyant vehicle body 2 is formed in a substantially square shape by four flotation chambers 21 in plan view, but the present invention is not limited to this configuration. That is, the shape of the buoyant vehicle body 2 may be formed to have other shapes, such as a hexagonal shape and a circular ring shape, in which, in plan view, a plurality of flotation chambers are respectively located at positions point-symmetric with respect to the center, and in which a plurality of the flotation chambers are connected to each other by the connecting portion 21a.

Further, as shown in FIG. 3, an enclosed space in which gas is filled is formed in the buoyant vehicle body 2. In the first embodiment, the flotation chambers 21 are made to communicate with the connecting portions 21a, and hence, the gas is hermetically filled in the whole buoyant vehicle body 2, but the present invention is not limited to this configuration. The flotation chambers 21 may not communicate with each other, and each of the flotation chambers 21 may be independently sealed. Further, it is preferred that the sealing gas is helium gas or hydrogen gas, but another gas having a specific gravity smaller than air may also be used as the sealing gas. Further, although not shown, the buoyant vehicle body 2 is provided with a check valve which discharges the gas so that the pressure of the gas is maintained at not higher than a predetermined pressure. Thereby, a part of warmed gas is discharged to the outside by the temperature adjusting means 5 described below, so that the specific gravity of the gas in the buoyant vehicle body 2 can be reduced.

Further, the buoyant vehicle body 2 of the first embodiment is configured by a light weight and high strength material, such as carbon fiber, fiber reinforced plastic using glass fiber, or other resin, but the present invention is not limited to this configuration. The buoyant vehicle body 2 may be configured by other materials depending upon cost and application. Further, as shown in FIG. 1, a solar photovoltaic element 24 is provided on the surface of the buoyant vehicle body 2 to generate electric power for operating the vertical propulsion propeller group 3, the horizontal propulsion propeller group 4, and the temperature adjusting means 5.

Further, as shown in FIG. 2 and FIG. 3, in the first embodiment, an omnidirectional camera 6 for aerial photography is provided below the vertical opening portion 22. It should be noted that the installation position of the camera 6 is not limited to the portion below the vertical opening portion 22, and an upper position, an outer peripheral position, or the like, of the buoyant vehicle body 2, may be arbitrarily selected as the installation position of the camera 6. Further, the camera 6 is provided below the vertical opening portion 22, but the present invention is not limited to this. The vertical opening portion 22 may also be configured to hold or carry a load or a person.

Further, as shown in FIG. 1, the buoyant vehicle body 2 is provided with a ring-shaped ring frame 25 which surrounds the outer periphery so as to contact each of the flotation chambers 21. The ring frame 25 supports the buoyant vehicle body 2 and serves as a frame member, to which the vertical propulsion propeller group 3 and the horizontal propulsion propeller group 4 are attached. It should be noted that the ring frame 25 may be formed by a light weight and high strength material, which includes such as plastic, aluminum, high rigidity rubber, or a material formed by coating resin, such as urethane, with carbon fiber reinforced plastic.

Next, the vertical propulsion propeller group 3 will be described. The vertical propulsion propeller group 3 is provided to propel the buoyant vehicle body 2 in the vertical direction and is configured by the four vertical propulsion propellers 31. As shown in FIG. 1, in the first embodiment, each of the vertical propulsion propellers 31 includes: a set of four blades 32; a rotary motor 33 which rotates each of the four blades 32; and a protection ring 34 which is provided in the outer periphery of the blades 32.

A blade used for a general propeller is adopted as the blade 32. Since the buoyant vehicle body 2 is enabled to easily float by the buoyancy force due to the density difference between the gas and air, the buoyant vehicle body 2 does not require large lifting force, and hence can use a relatively small blade 32. Further, the rotary motor 33 is a commercially available motor, and a set of the four blades 32 are connected to the rotating shaft at equal intervals. Further, the protection ring 34 is provided to protect the rotating blade 32 from colliding with an obstacle or the like, and is formed to have an annular shape slightly larger than the rotation locus of the tip of the blade 32.

In the present first embodiment, each of the vertical propulsion propellers 31 is respectively arranged between the propeller arrangement concave portion 23 and the ring frame 25 arranged at each of four locations formed in the outer periphery of the buoyant vehicle body 2, and is fixed so that the rotating shaft of the rotary motor 33 is oriented in the vertical direction so that the propulsive force is exhibited in the vertical direction.

The horizontal propulsion propeller group 4 is provided to propel the buoyant vehicle body 2 in the horizontal direction and is configured by four horizontal propulsion propellers 41. As shown in FIG. 2, each of the horizontal propulsion propellers 41 includes: a set of four blades 42; a rotary motor 43 which rotates each of the four blades 42; and a takeoff and landing ring 44 which serves also as a protection frame. The horizontal propulsion propeller 41 is mainly used for horizontal movement, and hence, a relatively small blade 42 can be used as the horizontal propulsion propeller 41.

Further, each of the horizontal propulsion propellers 41 is pivotally supported at a substantially central position of the vertical direction thickness of the buoyant vehicle body 2, and the takeoff and landing ring 44, which is formed to have a diameter larger than the vertical direction thickness of the buoyant vehicle body 2, is arranged at the outer periphery of each of the horizontal propulsion propellers 41. Similarly to the protection ring 34 of the vertical propulsion propeller 31, the takeoff and landing ring 44 is provided to protect the rotating blade 42 from colliding with an obstacle, or the like, and is also provided to serve as a leg which is brought into contact with the ground at the time of takeoff and landing before the buoyant vehicle body 2 is brought into contact with the ground.

In the first embodiment, each of the horizontal propulsion propellers 41 is arranged at the outer side of the ring frame 25 on which each of the vertical propulsion propellers 31 is arranged. That is, as shown in FIG. 4, each of the horizontal propulsion propellers 41 is provided along a horizontal wind passage 26 to prevent the generated wind from colliding with the buoyant vehicle body 2 and dissipating. Each of the horizontal propulsion propellers 41 is fixed so that the rotating shaft of the rotary motor 43 is oriented in the direction of the center of the buoyant vehicle body 2 so that the propulsive force is exhibited in the horizontal direction.

Further, in the first embodiment, the rotary motor 43 is configured to be able to rotate the horizontal propulsion propeller 41 in the forward and reverse directions. Further, a pair of the horizontal propulsion propellers 41, which are disposed along the wind passage 26, are interlockingly controlled by a controller (not shown) so as to send wind in the same direction. That is, when the buoyant aerial vehicle 1A is moved in the left direction as shown in FIG. 5, the front horizontal propulsion propeller 41 sends wind to the inside of the buoyant vehicle body 2, and the rear horizontal propulsion propeller 41 sends wind to the outside of the buoyant vehicle body 2. At this time, the wind sent by the front horizontal propulsion propeller 41 is made to smoothly flow along the wind passage 26, so that the propulsive force is hardly attenuated. Thereby, in conjunction with the propulsive force by the rear horizontal propulsion propeller 41, large propulsive force is generated in the moving direction so that the buoyant aerial vehicle 1A can quickly move.

It should be noted that, in the first embodiment, four vertical propulsion propellers 31 and four horizontal propulsion propellers 41 are provided, but the present invention is not limited to this configuration. The number and arrangement of the propulsion propellers may be appropriately changed as long as the propulsive force in the substantially vertical direction and the propulsive force in the substantially horizontal direction can be generated.

The temperature adjusting means 5 is provided for adjusting the gas temperature inside the buoyant vehicle body 2. The temperature adjusting means 5 in the first embodiment is configured by a panel-shaped heater which generates heat when energized. As shown in FIG. 1, the temperature adjusting means 5 is provided in two places along the vertical opening portion 22 of the buoyant vehicle body 2. It should be noted that the installation position of the temperature adjusting means 5 is not limited to the vertical opening portion 22, and may be appropriately selected from an outer peripheral portion, an inside portion, or the like, of the buoyant vehicle body 2.

Further, although not shown, the buoyant vehicle body 2 is provided therein with a compressed gas cylinder filled with the gas which has the specific gravity smaller than air, for replenishing the gas.

Next, the operation of each of the components in the buoyant aerial vehicle 1A of the first embodiment will be described.

The buoyant vehicle body 2 is filled with gas having a specific gravity smaller than the surrounding air such as, for example, helium, hydrogen, or air warmer than the surrounding air, or oxygen and nitrogen. Thereby, the buoyant vehicle body 2 has buoyancy force by which the buoyant aerial vehicle 1A is made to float to a predetermined height position even when the vertical propulsion propeller group 3 is not driven. Further, even when the vertical propulsion propeller group 3 and the horizontal propulsion propeller group 4 are stopped, the buoyant aerial vehicle 1A is prevented from suddenly dropping or is continuously held in a floating state, and hence, the risk of crashing of the buoyant aerial vehicle 1A is reduced. It should be noted that the floatable height of the buoyant vehicle body 2 is adjusted by adjusting the filling amount of the gas and the temperature of the gas.

Further, in the first embodiment, the flotation chambers 21 are respectively arranged at positions point-symmetric with respect to the center to maintain a balance suitable for floating. For this reason, when the buoyant aerial vehicle 1A is moved, each of the flotation chambers 21, which are point-symmetrically arranged, is floated by the same buoyancy force, and hence, the attitude of the buoyant vehicle body 2 is always maintained to be substantially horizontal, and thus does not easily lose its balance and flight control is easy.

Further, the connecting portions 21a, each of which is tapered into a flat shape thinner than the central portions of the flotation chambers 21, are arranged in pairs at positions point-symmetric with respect to the center. For this reason, as shown in FIG. 4, each pair of the connecting portions 21a is arranged on the straight line passing through the center of the buoyant vehicle body 2, and thereby, the wind passages 26, which is linear in the horizontal direction, is secured at least in two directions. Further, each of the wind passages 26 smoothly passes the side wind while allowing the side wind to escape upwards and downwards, to substantially reduce the wind power resistance.

The horizontal movement of the buoyant aerial vehicle 1A is performed mainly by driving the horizontal propulsion propeller group 4. When the blade 42 is rotated by the rotary motor 43, each of the horizontal propulsion propellers 41 generates wind to exhibit the horizontal propulsive force. At this time, as shown in FIG. 4, the wind generated by the horizontal propulsion propeller 41 passes through the horizontal wind passage 26 configured by the thin connecting portions 21a of the buoyant vehicle body 2. Therefore, the wind is hardly attenuated, so that the lifting force of the blades 42 can be efficiently converted to the propulsive force.

Further, when the buoyant vehicle body 2 receives wind pressure due to side wind during horizontal flight or hovering of the buoyant aerial vehicle 1A, the horizontal wind passage 26 allows the side wind to smoothly pass, and thereby, the wind power resistance of the side wind in at least two directions can be significantly reduced. For this reason, the buoyant aerial vehicle 1A reduces the risk of crashing due to sudden gusty wind or the like, to thereby secure high safety, and suppresses the influence of the side wind, to thereby facilitate the control of movement and exhibit high mobility capability.

That is, as described above, each of the connecting portions 21a configures the wind passage 26 which suppresses the horizontal wind power resistance, and also which hardly blocks the wind generated by the horizontal propulsion propellers 41 and thereby enables the horizontal propulsive force to be easily generated. For this reason, as shown in FIG. 2 and FIG. 3, the horizontal propulsion propeller group 4 can be arranged to overlap with the buoyant vehicle body 2 in side view, and thereby, can reduce the influence of side wind thereon as much as possible.

Further, as shown in FIG. 5, each of the outer peripheral edge portions of the buoyant vehicle body 2 is formed at an acute angle. For this reason, the wind pressure, which is received from the side surface of the buoyant vehicle body 2 during the horizontal flight, is divided in the vertical direction by the outer peripheral edge portion, to flow along the upper and lower surfaces of the buoyant vehicle body 2. For this reason, the wind power resistance due to the wind pressure is suppressed, so that the flying speed is improved. Further, the buoyant aerial vehicle 1A is hardly affected by the side wind during hovering, and hence can be prevented from being greatly displaced from the desired stop position.

The vertical propulsion propeller group 3 is used for the movement in the substantially vertical direction when the buoyant aerial vehicle 1A is moved, lifted or lowered at the time of takeoff or landing. In the first embodiment, the buoyant aerial vehicle 1A has buoyancy force to enable hovering with only the gas filled in the buoyant vehicle body 2. For this reason, when the buoyant aerial vehicle 1A is quickly floated to a predetermined height, the vertical propulsion propeller group 3 generates buoyancy force in the upward direction. When the buoyant aerial vehicle 1A is made to hover, the vertical propulsion propeller group 3 is stopped. Also, when the buoyant aerial vehicle 1A is landed, the vertical propulsion propeller group 3 generates the downward propulsive force larger than the buoyancy force.

Further, since propeller arrangement concave portion 23 arranges the vertical propulsion propeller group 3 on the outer side of the buoyant vehicle body 2, it is not necessary to arrange the vertical propulsion propeller group 3 at the vertical opening portion 22. For this reason, when the buoyant aerial vehicle 1A is moved in the vertical direction by the vertical propulsion propeller group 3, air is allowed to flow through the vertical opening portion 22 at the center of the buoyant vehicle body 2 as shown in FIG. 6. For this reason, the air resistance applied to the buoyant aerial vehicle 1A at the time of vertical movement is suppressed. Further, the upper side of the buoyant vehicle body 2 is opened by the vertical opening portion 22, and hence, when photographing is performed by using the camera 6, 360 degree photographing and upper air side photographing can be performed. However, the vertical opening portion 22 is not necessarily an essential requirement.

Further, when performing video photography by a camera mounted to a conventional drone, the video is easily disturbed by the vibration of the propeller. However, in the first embodiment, even when the vertical propulsion propeller group 3 is not driven, the buoyant aerial vehicle 1A is made to hover by the buoyancy force of the gas filled in the buoyant vehicle body 2. For this reason, in the first embodiment, the influence of vibration caused by the vertical propulsion propeller group 3 is eliminated, and hence, a video with extremely low disturbance can be photographed.

When the panel heater is warmed by the temperature adjusting means 5, the gas, filled in the buoyant vehicle body 2, is expanded, and thereby, the specific gravity of the gas is reduced. Further, a part of the expanded gas is discharged to the outside by the check valve, and thereby, the total mass of the gas is reduced, so that the buoyant force acting on the buoyant aerial vehicle 1A is increased. On the other hand, when the temperature of the gas in the buoyant vehicle body 2 is decreased by the temperature adjusting means 5, the buoyancy force is reduced, and thereby, the height adjustment and landing can be easily performed.

It should be noted that, when the gas is discharged from the check valve, so that the gas filled in the buoyant vehicle body 2 is insufficient, the gas is replenished by the compressed gas cylinder, so that the predetermined floating height can be maintained.

Further, the blade 32 of the vertical propulsion propeller 31 and the blade 42 of the horizontal propulsion propeller 41 are relatively small, and hence, sounds generated by the blades 32 and 42 are small. Further, the space for carrying a load, and the space for boarding a person can be sufficiently secured. Therefore, there is less risk that the boarding person is brought into contact with the rotating blades 32 and 42.

Further, at the time of takeoff and landing of the buoyant aerial vehicle 1A, the takeoff and landing ring 44 is brought into contact with the ground before the buoyant vehicle body 2 is brought into contact with the ground. Therefore, the takeoff and landing ring 44 serves as a leg portion, to prevent the buoyant vehicle body 2 from being damaged.

According to the buoyant aerial vehicle 1A of the first embodiment described above, the following effects can be obtained.

1. By the difference in a specific gravity between the gas in the buoyant vehicle body 2 and the surrounding air, the buoyant aerial vehicle 1A is made to float to a predetermined height, or is prevented from suddenly dropping. Therefore, even when a trouble of the propeller or a trouble of the drive source of the buoyant aerial vehicle 1A is caused, the buoyant aerial vehicle 1A is prevented from suddenly dropping, as a result of which the safety of the buoyant aerial vehicle 1A can be ensured.

2. By the horizontal wind passage 26, the side wind is made to smoothly flow so that the wind power resistance can be significantly reduced. Therefore, the buoyant aerial vehicle 1A can reduce the risk of crashing due to sudden gusty wind or the like, to thereby secure high safety, and also can suppress the influence of the side wind, to thereby facilitate the control of movement and exhibit high mobility capability.

3. Each of the flotation chambers 21, which are point-symmetrically arranged, is floated by the same buoyancy force, so that the attitude of the buoyant vehicle body 2 is always maintained in the substantially horizontal direction. As a result, loss of balance of the buoyant aerial vehicle 1A is prevented, and thereby, the flight thereof can be easily controlled.

4. In addition to the vertical propulsion propeller 31, the buoyant aerial vehicle 1A is provided with the horizontal propulsion propeller 41 for obtaining the horizontal propulsive force, and thereby can smoothly move in the horizontal direction.

5. The buoyant vehicle body 2 is formed to have the shape which can reduce the air resistance, and thereby, the flight control of the buoyant aerial vehicle 1A can be easily performed, and also, the flying speed can be improved. Therefore, during hovering, the buoyant aerial vehicle 1A is hardly affected by the influence of side wind, and thereby, can remain motionless at a predetermined position.

6. The buoyant aerial vehicle 1A smooths the flow of air caused by the vertical propulsion propeller 31 and the horizontal propulsion propeller 41, and the flow of air during movement, and thereby can move with high efficiency.

7. By adjusting the temperature of the gas filled in the buoyant vehicle body 2, the buoyancy force on the buoyant aerial vehicle 1A can be adjusted and the floating height can be adjusted.

8. Since the size of the blades 32 and 42 can be made smaller by the buoyant force of the gas, the buoyant aerial vehicle 1A can suppress sounds generated by the blades 32 and 42, and also sufficiently secure the space for carrying a load, and the space for boarding a person.

9. Since the takeoff and landing ring 44 serves as a leg portion of the buoyant aerial vehicle 1A, another leg portion does not have to be separately provided, and hence, the size of the buoyant aerial vehicle 1A can be made compact.

10. In an event, such as the Olympic Games (registered trademark), or the World Cup of soccer, in which it is required that no trouble be caused, the buoyant aerial vehicle 1A can perform aerial photography safely.

11. Since the buoyant aerial vehicle 1A can float without using the vertical propulsion propeller 31 and hence is not affected by the influence of vibration, the buoyant aerial vehicle 1A can perform video photography with less disturbance.

12. The flight altitude can be easily adjusted, and hence, the air route for air transport can be set according to the weight of load. The air route for stable air transport can be set while securing safety, for example, in such a manner that the air route of the altitude of 5 to 10 m is set to the load zone of 5 to 10 kg, that the air route of the altitude of 10 to 20 m is set to the load zone of 1 to 5 kg, and that the air route of the altitude of not less than 30 m is set to the load zone of less than 1 kg.

Next, a buoyant aerial vehicle according to a second embodiment of the present invention will be described. It should be noted that, in the second embodiment, the description of configurations the same as or equivalent to the configurations of the above-described first embodiment will be omitted.

As shown in FIG. 7, the buoyant aerial vehicle 1B according to the second embodiment is characterized in that each of the horizontal propulsion propeller group 4 is supported slidably along the ring frame 25 in the left-right direction. Specifically, the ring frame 25 is formed to have a shape like a curtain rail, at the center of which a rail groove is provided, and also, the rotary motor 43 is attached to a sliding member (not shown) which is slidable along the rail groove.

The sliding member may be configured by a rubber roller, or the like, capable of rotating in the rail groove, and also configured by a pinion, or the like, engaging with a rack provided in the rail groove. Further, the sliding member is rotated by a drive motor, such as a stepping motor, rotatable in both directions, and thereby, the left and right positions of each horizontal propulsion propeller of the horizontal propulsion propeller group 4 can be accurately finely adjusted.

Further, the buoyant aerial vehicle 1B in the second embodiment is provided with a wind pressure sensor which detects wind pressure, and is provided with a controller which controls the drive motor on the basis of the detection result of the wind pressure sensor, to adjust the left and right positions of the horizontal propulsion propeller group 4. Thereby, the left and right positions of the horizontal propulsion propeller group 4 can be controlled in real time to face the wind direction, as a result of which, in a certain amount of wind, the buoyant aerial vehicle 1B can perform hovering (remaining stationary in the air) at the same position and the same altitude.

Further, in the second embodiment, the buoyant aerial vehicle 1B is provided with a position sensor which detects the present position by GPS (Global Positioning System), or the like, and is provided with a controller which controls the drive motor on the basis of the detection result of the position sensor to adjust the left and right positions of the horizontal propulsion propeller group 4. Thereby, the left and right positions of each of the horizontal propulsion propeller group 4 can be controlled in real time to cancel the amount of deviation from a predetermined hovering position, as a result of which, even when the buoyant aerial vehicle 1B is deviated from the hovering position by strong wind, the buoyant aerial vehicle 1B can be immediately returned to the original position.

It should be noted that, in the second embodiment, the controller controls the drive motor on the basis of the detection results of the wind pressure sensor and the position sensor, to thereby adjust the left and right positions of the horizontal propulsion propeller group 4, but the present invention is not limited to this constitution. The buoyant aerial vehicle 1B may also be configured such that only one of the sensors is provided, and the controller adjusts the left and right positions of the horizontal propulsion propeller group 4 on the basis of the detection result of the sensor.

In addition to the effects of the first embodiment described above, the second embodiment described above provides effects that the buoyant aerial vehicle 1B can be made to hover at the same position and at the same altitude even in a certain amount of wind, and thereby, even when the buoyant aerial vehicle 1B is deviated from the hovering position by strong wind, the buoyant aerial vehicle 1B can be immediately returned to the original position.

Next, a buoyant aerial vehicle according to a third embodiment of the present invention will be described. It should be noted that, in the third embodiment, the description of configurations the same as or equivalent to the configurations of the above-described first embodiment will be omitted.

The buoyant aerial vehicle 1C of the third embodiment is characterized in that each of the flotation chambers 21 of the buoyant vehicle body 2 is formed to have a longitudinally long shape. Specifically, as shown in FIG. 8, the buoyant vehicle body 2 is configured by a plurality of the flotation chambers 21 which are formed independently of each other and connected by the ring frame 25. Further, as shown in FIG. 9 and FIG. 10, each of the flotation chambers 21 is configured such that the central portion thereof is bulged in the left-right direction in side view, and such that the outer peripheral edge of each of the upper and lower end portions of the flotation chamber is formed into an acute angle. Further, as shown in FIG. 8, each spaces between each of the flotation chambers 21 may form horizontal wind passages 26 in at least two directions. Although the third embodiment is provided with connecting frames 27 for connecting the respective flotation chambers 21 with respect to the center of the ring frame 25, the present invention is not limited to this configuration.

According to the third embodiment having the above-described configuration, the plan view area of each of the flotation chambers 21 is significantly reduced as compared with the first embodiment. For this reason, even when falling objects, such as rain, snow, hail, ashes, or the like, fall, the buoyancy force is not reduced, and also, the impact force from the falling objects can be minimized. Further, the outer peripheral edge of each of the upper and lower end portions is formed into an acute angle, and hence, the falling objects hardly pile up on the buoyant vehicle body 2, as a result of which the increase of weight can be prevented.

In addition to the above-described effects of the first embodiment, the third embodiment described above has the effects that, even when falling objects, such as rain, snow, hail, ashes, or the like, fall, the impact force from the falling objects can be minimized, and thereby, stable flight and stable photographing can be performed. Further, the falling objects are suppressed from piling up on the buoyant vehicle body 2, and thereby, the increase of weight of the buoyant vehicle body 2 is prevented, as a result of which falling, or the like, of the buoyant aerial vehicle can be prevented. Therefore, the optimal flight and photographing can be performed according to the weather in such a manner that, at the time of fine weather, the buoyant aerial vehicle 1A of the first embodiment is used, and that, at the time of bad weather, the buoyant aerial vehicle 1C of the third embodiment is used.

Next, a buoyant aerial vehicle according to a fourth embodiment of the present invention will be described. It should be noted that, in the fourth embodiment, the description of configurations the same as or equivalent to the configurations of the above-described first embodiment will be omitted.

A buoyant aerial vehicle 1D of the fourth embodiment is characterized so that a person can board. Specifically, as shown in FIG. 11 to FIG. 13, the buoyant vehicle body 2 is configured by a plurality of the flotation chambers 21 which are formed independently of each other and connected by the connecting frames 27. Further, a boarding chamber 7 for boarding a person is provided at spaces between each of the flotation chambers 21, and a constricted portion 21b is formed at approximately the center of each of the flotation chambers 21 as shown in FIG. 13 and FIG. 14. Further, as shown in FIG. 13, the spaces between each of the flotation chambers 21, and the constricted portions 21b, may form horizontal wind passages 26 in at least two directions.

In the fourth embodiment having the above-described configuration, the safety and stability required for boarding a person are secured. That is, a crash of the buoyant aerial vehicle 1D is prevented by the buoyant vehicle body 2, and hence, the buoyant aerial vehicle 1D has high safety. Also, the influence of side wind is reduced by the horizontal wind passage 26, and hence, the buoyant aerial vehicle 1D has high stability. Further, since the large flotation chamber 21 is arranged at each of the left and right sides of the boarding chamber 7, the buoyant aerial vehicle 1D hardly rolls, and thereby, motion sickness is suppressed.

In addition to the above-described effects of the first embodiment, the fourth embodiment described above has the effect that it can fly a person safely. Further, the fourth embodiment can provide private flight means which is inexpensive and has an excellent design. Further, the fourth embodiment provides not only means suitable for flying a person, but also means suitable for carrying a load.

It should be noted that the buoyant aerial vehicle according to the present invention is not limited to each of the above-described embodiments, and may be suitably changed.

In each of the above-described embodiments, the buoyant aerial vehicles 1A to 1D for flying in the air are described, the present invention is not limited to these configurations. For example, the buoyant aerial vehicle 1 can be used by being floated on the surface of water in such a manner that the buoyant force of the gas filled in the buoyant vehicle body 2 is reduced, or that air is filled in the buoyant vehicle body 2. In this case, the horizontal propulsion propeller group 4 can be used as the power source. Also, when the buoyant aerial vehicle 1 is configured to able to carry a boarding person, the buoyant aerial vehicle 1 may obtain the propulsive force by using a separately provided foot pedals, or the like.

Further, in each of the above-described embodiments, the check valve and the compressed gas cylinder are provided to adjust the gas volume in the buoyant vehicle body 2, but these may not be provided as necessary.

REFERENCE SIGNS LIST 1A, 1B, 1C, 1D Buoyant aerial vehicle
2 Buoyant vehicle body
3 Vertical propulsion propeller group
4 Horizontal propulsion propeller group
5 Temperature adjusting means
6 Camera
7 Boarding chamber
21 Flotation chamber
21a Connecting portion
21b Constricted portion
22 Vertical opening portion
23 Propeller arrangement concave portion
24 Solar photovoltaic element
25 Ring frame
26 Wind passage
27 Connecting frame
31 Vertical propulsion propeller
32 Blade
33 Rotary motor
34 Protection ring
41 Horizontal propulsion propeller
42 Blade
43 Rotary motor
44 Takeoff and landing ring

The invention claimed is:

1. A buoyant aerial vehicle, comprising:
a buoyant vehicle body in which gas having a specific gravity smaller than air is hermetically filled;
a vertical propulsion propeller which provides vertical propulsive force to the buoyant vehicle body; and
a horizontal propulsion propeller which provides horizontal propulsive force to the buoyant vehicle body, wherein
the buoyant vehicle body is configured with
a plurality of flotation chambers that are arranged at positions point-symmetric with respect to a center of the buoyant vehicle body in a plan view, central portions of the flotation chambers being bulged in a side view, the plan view being defined as seen in a vertical direction and the side view being defined as seen in a horizontal direction, and
a plurality of connecting portions that connect the flotation chambers such that two of the floatation chambers, which are adjacent, are connected with one of the connecting portions, the connecting portions being formed in a flat shape thinner than the central portions of the flotation chambers in the side view such that wind passages along which the air flows in the horizontal direction are formed on the connecting portions, and the wind passages being oriented in at least two directions in the plan view.

2. The buoyant aerial vehicle according to claim 1, wherein
the buoyant vehicle body further includes a vertical opening portion through which the air passes in the vertical direction formed in the vicinity of a central position of the buoyant vehicle body in the plan view.

3. The buoyant aerial vehicle according to claim 2, wherein
the horizontal propulsion propeller is arranged at an outer side of one of the connecting portions, and
a rotating shaft of the horizontal propulsion propeller is fixed towards the central position of the buoyant vehicle body.

4. The buoyant aerial vehicle according to claim 2, wherein
a propeller arrangement concave portion for arranging the vertical propulsion propeller is formed at one of the connecting portions in an outer periphery of the buoyant vehicle body.

5. The buoyant aerial vehicle according to claim 1, comprising:
temperature adjusting means which adjusts the temperature of the gas; and
a check valve which discharges the gas so that the pressure of the gas is maintained at not higher than a predetermined pressure.

6. The buoyant aerial vehicle according to claim 1, comprising:

a ring frame which slidably supports the horizontal propeller;

a drive motor which drives the horizontal propulsion propeller along the ring frame;

one or both of a wind pressure sensor which detects wind pressure and a position sensor which detects a present position; and a controller which adjusts left and right positions of the horizontal propulsion propeller by controlling the drive motor on the basis of detection results of one or both of the wind pressure sensor and the position sensor.

7. The buoyant aerial vehicle according to claim 1, further comprising:

one or more horizontal propulsion propellers that provide the horizontal propulsive force, wherein each of the horizontal propulsion propellers is arranged at an outer side of each of the connecting portions, and rotating shafts of the horizontal propulsion propellers are fixed towards the central position of the buoyant vehicle body.

8. The buoyant aerial vehicle according to claim 7, further comprising one or more vertical propulsion propellers that provide the vertical propulsive force, wherein each of the vertical propulsion propellers is arranged at the outer side of each of the connecting portions, and rotating shafts of the vertical propulsion propellers are fixed in parallel.

9. The buoyant aerial vehicle according to claim 8, wherein the connecting portions have two surfaces that are up surface and down surface with respect to the vertical direction, the two wind passages are positioned on the up surface, being defined as first wind passages, and the connecting portions further form two additional wind passages on the down surface, being defined as second wind passages, the second wind passages are oriented in the same directions as the first wind passages in the plan view.

10. The buoyant aerial vehicle according to claim 1, further comprising one or more vertical propulsion propellers that provide the vertical propulsive force, wherein each of the vertical propulsion propellers is arranged at an outer side of each of the connecting portions, and rotating shafts of the vertical propulsion propellers are fixed in parallel.

11. A buoyant aerial vehicle, comprising:

a buoyant vehicle body in which gas having a specific gravity smaller than air is hermetically filled;

a vertical propulsion propeller which provides vertical propulsive force to the buoyant vehicle body; and a horizontal propulsion propeller which provides horizontal propulsive force to the buoyant vehicle body, wherein the horizontal propulsion propeller is pivotally supported at a substantially central position of a vertical direction thickness of the buoyant vehicle body, and a takeoff and landing ring, which is formed to have a diameter larger than the vertical direction thickness of the buoyant vehicle body, is arranged on an outer periphery of the horizontal propulsion propeller.

12. A buoyant aerial vehicle, comprising:

a buoyant vehicle body in which gas having a specific gravity smaller than air is hermetically filled;

a vertical propulsion propeller which provides vertical propulsive force to the buoyant vehicle body; and a horizontal propulsion propeller which provides horizontal propulsive force to the buoyant vehicle body, wherein the buoyant vehicle body is formed by a plurality of independent flotation chambers, each of which is connected to the adjacent flotation chambers by a ring frame, each of the flotation chambers is formed in a longitudinally long shape in a side view, the side view being defined as seen in a horizontal direction and the longitudinally long shape having a vertical direction thickness that is greater than a horizontal direction thickness, and spaces between the flotation chambers form horizontal wind passages along which the air flows in the horizontal direction, and the wind passages being oriented in at least two directions.

13. A buoyant aerial vehicle, comprising:

a buoyant vehicle body in which gas having a specific gravity smaller than air is hermetically filled;

a vertical propulsion propeller which provides vertical propulsive force to the buoyant vehicle body such that the buoyant vehicle body runs in a vertical direction by the vertical propulsive force; and a horizontal propulsion propeller which provides horizontal propulsive force to the buoyant vehicle body such that the buoyant vehicle body runs in a longitudinal direction by the horizontal propulsive force, the longitudinal direction being horizontal and perpendicular to the vertical direction, wherein the buoyant vehicle body is formed by at least two of independent flotation chambers connected to each other by connecting frames, these flotation chambers being arranged in parallel in a width direction that is horizontal and substantially perpendicular to the longitudinal direction;

a boarding chamber in which a person can board is provided in a space between the flotation chambers in the width direction;

a constricted portion is formed in the vicinity of the center of each of the flotation chambers, the constricted portion being in a recess shape seen from the width direction; and a first path that is formed between the flotation chambers in the width direction forms a first horizontal wind passage, which extends in the longitudinal direction, along which the air flows in the longitudinal direction, a second path that is formed on the constricted portions of the flotation chambers forms a second horizontal wind passage, which extends in the width direction, along which the air flows in the width direction.

* * * * *